(12) United States Patent
Adam

(10) Patent No.: US 9,543,764 B2
(45) Date of Patent: Jan. 10, 2017

(54) METHOD AND SYSTEM FOR USING RENEWABLE ENERGY SOURCES

(75) Inventor: Dirk Adam, Hamburg (DE)

(73) Assignee: natcon7 GmbH, Hamburg (DE)

( * ) Notice: Subject to any disclaimer, the term of this patent is extended or adjusted under 35 U.S.C. 154(b) by 1994 days.

(21) Appl. No.: 12/628,624

(22) Filed: Dec. 1, 2009

(65) Prior Publication Data

US 2010/0161147 A1 Jun. 24, 2010

(30) Foreign Application Priority Data

Dec. 23, 2008 (DE) .................. 10 2008 063 250

(51) Int. Cl.
*G06F 1/26* (2006.01)
*H02J 3/38* (2006.01)
(Continued)

(52) U.S. Cl.
CPC ............... *H02J 3/383* (2013.01); *G06Q 10/04* (2013.01); *H02J 3/382* (2013.01); *H02J 3/386* (2013.01); *H02J 13/0062* (2013.01); *F24J 2200/04* (2013.01); *Y02E 10/46* (2013.01); *Y02E 10/563* (2013.01); *Y02E 10/763* (2013.01);
(Continued)

(58) Field of Classification Search
None
See application file for complete search history.

(56) References Cited

U.S. PATENT DOCUMENTS 5,467,265 A 11/1995 Yamada et al.
5,479,358 A 12/1995 Shimoda et al.
(Continued)

FOREIGN PATENT DOCUMENTS

DE 10 2004 056 254 A1 6/2006
DE 20 2008 017 271 U1 7/2009
EP 1 801 950 A2 6/2007

OTHER PUBLICATIONS

XP007909094—100% controllable—The renewable combined cycle power plant (pp. 6-9 cited in the European Search Report).

(Continued)

*Primary Examiner* — Sean Shechtman
(74) *Attorney, Agent, or Firm* — Vidas, Arrett & Steinkraus, P.A.

(57) ABSTRACT

Method for using renewable energy sources, comprising
  at least one remote energy generation plant, which is operated by a renewable energy source,
  a remote control unit at the location of the at least one remote energy generation plant, which controls the operation thereof, and
  a central control unit,
the method comprising the following steps:
a) Producing a proposed schedule, in which for a future time period presettings for the operation of the at least one remote energy generation plant are established, and transmitting the proposed schedule to the central control unit via a computer network,
b) Producing a schedule based on the proposed schedule,
c) Transmitting the schedule from the central control unit to the remote control unit via a computer network,
d) Automatic control of the at least one remote energy generation plant by the remote control unit according to the schedule.

1 Claim, 1 Drawing Sheet

(51) Int. Cl.
*G06Q 10/04* (2012.01)
*H02J 13/00* (2006.01)

(52) U.S. Cl.
CPC ............... *Y02E 40/72* (2013.01); *Y02E 60/74* (2013.01); *Y02E 60/7838* (2013.01); *Y04S 10/123* (2013.01); *Y04S 10/30* (2013.01); *Y04S 40/124* (2013.01)

(56) References Cited

U.S. PATENT DOCUMENTS

| | | | |
|---|---|---|---|
| 6,021,402 A | 2/2000 | Takriti | |
| 6,529,839 B1 | 3/2003 | Ness et al. | |
| 6,681,156 B1 * | 1/2004 | Weiss | 700/291 |
| 6,745,109 B2 * | 6/2004 | Kojima et al. | 700/291 |
| 6,925,385 B2 * | 8/2005 | Ghosh et al. | 702/14 |
| 7,406,364 B2 * | 7/2008 | Andren et al. | 700/286 |
| 7,509,190 B2 * | 3/2009 | Emery et al. | 700/291 |
| 7,603,202 B2 * | 10/2009 | Weitkamp | 700/287 |
| 2003/0102675 A1 | 6/2003 | Noethlichs | |
| 2004/0230377 A1* | 11/2004 | Ghosh et al. | 702/3 |
| 2005/0165511 A1 | 7/2005 | Fairlie | |
| 2007/0299548 A1 | 12/2007 | Weitkamp | |
| 2008/0195255 A1 | 8/2008 | Lutze et al. | |
| 2008/0249665 A1* | 10/2008 | Emery et al. | 700/291 |
| 2010/0161147 A1 | 6/2010 | Adam | |

OTHER PUBLICATIONS

Michael Arestan Marcella Narracci and Immacolata Tommasi: Influence of Iron, Nickel and Cobalt on Biogas Production During the Anaerobic Fermentation of Fresh Residual Biomass: METEA Research Center and Department of Chemistry, University of Bari, Bampus Univeritario. ISSN 0275-7540 print; ISSN 1029-0370 online (copyright) 2003 Taylor & Francis Ltd. DOIO: 10.1080/02757540310001629134.

A. Wilkie, M. Goto, F.M. Bordeaus and P.H. Smith: Enhancement of Anaerobid Methanogenesis from Mapiergrass by Addition of Micronutrients. Department of Microbiology and Cell Science, University of FL. Florida Agricultural Experiment Station Journal Series No. 7557.

Grundlagen and Konzept eines Virtual-Powerplant in Deutschland; Basics and conception of a Virtual-Powerplant in Germany; Fritz Santjer, DEWI; DEWI Magazin Nr. 20, Feb. 2002; pp. 37-42.

No limits for a full electricity supply by renewables; ewec 2008 Brussels; Reinhard Mackensen; Apr. 1, 2008; 18 pages.

Tagungsunterlagen; 11th Kasseler Symposium Energy Systems Technology; Information and Communication Technologies for tomorrow's Energy Supply; ISET 2006; pp. 1-98.

* cited by examiner

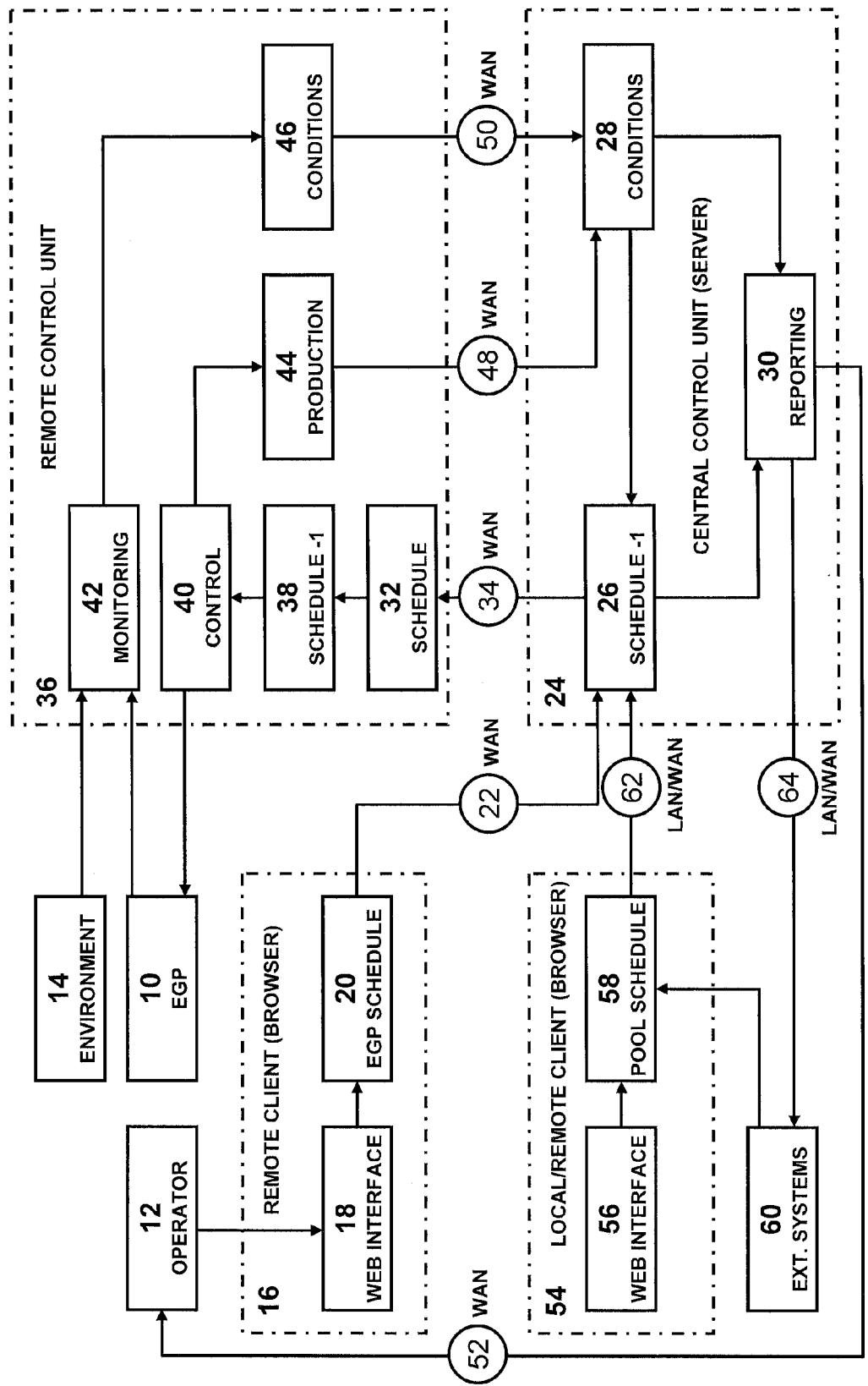

METHOD AND SYSTEM FOR USING RENEWABLE ENERGY SOURCES

CROSS-REFERENCE TO RELATED APPLICATIONS

Not applicable

STATEMENT REGARDING FEDERALLY SPONSORED RESEARCH

Not applicable

BACKGROUND OF THE INVENTION

The invention relates to a method and a system for using renewable energy sources. To this end, various energy generation plants are used which are operated by a renewable energy source. These include, in particular, biogas plants, geothermal plants, photovoltaic plants or solar collectors, water power plants and wind energy plants. Said energy generation plants convert the energy provided by the renewable energy sources, in particular, into electrical energy or thermal energy, which is easily available for further use.

Both when using the aforementioned energy source in separate networks and when supplying the energy made available to public power supply grids, the ability to control and predict the energy generation, which is only possible to a limited extent, represents a considerable challenge. A significant reason for the limited ability to control and predict the energy generation is in the fluctuating availability of "solar fuel", for example with a fluctuating wind supply. For remedying these problems, it is known to produce forecasts which, for example, are based on a weather prediction. The production of such forecasts is, however, difficult and whether the desired result is produced, namely a correct forecast of the energy actually provided in the forecast time period, is solely dependent on the implementation of the forecast.

A further reason for the limited ability to plan and predict the energy generated is the generally remote structure. For example, the energy generation of a biogas plant located in a remote agricultural business is additionally dependent on how the locally responsible operator operates the plant. Generally, the operator substantially only considers process engineering and plant engineering characteristics and the given boundary conditions at its location. Additionally, as a result of many other constraints which are not due to the technology, the operator may be prevented from fully exhausting the potential energy generated which is based on the available renewable raw material.

The aforementioned difficulties in the ability to plan and predict energy generation are a drawback for the use and acceptability of renewable energy sources. In particular, they may make the availability of rapidly accessible reserve energy and an upgrading of the power supply grids necessary.

Proceeding therefrom, it is the object of the invention to provide a method and a system for using renewable energy sources, which simplifies the planned use of the renewable energy sources and improves the ability to plan and predict the energy actually available.

BRIEF SUMMARY OF THE INVENTION

The method according to the invention serves for using renewable energy sources and requires at least one remote energy generation plant, which is operated by a renewable energy source, a remote control unit at the location of the at least one remote energy generation plant, which controls the operation thereof, and a central control unit. The method comprises the following steps:
a) Producing a proposed schedule, in which for a future time period presettings for the operation of the at least one remote energy generation plant are established, and transmitting the proposed schedule to the central control unit via a computer network,
b) Producing a schedule based on the proposed schedule,
c) Transmitting the schedule from the central control unit to the remote control unit via a computer network,
d) Automatic control of the at least one remote energy generation plant by the remote control unit according to the schedule.

The future time period covered by the schedule and the proposed schedule is predetermined in a fixed manner and may, for example, be a week, an hour or preferably a day. Thus the time period is subdivided into shorter time intervals which, for example, comprise a minute, an hour or preferably fifteen minutes. When producing the proposed schedule, for each of the predetermined time intervals within the planning time period it is established how the at least one remote energy generation plant is to be operated.

For transmitting the proposed schedule which has been produced to the central control unit a computer network is provided, in particular by incorporating the Internet. However, any other Wide Area Network (WAN) may also be used, for example a mobile radio network, or a wired network—telephone line.

Based on the proposed schedule, a schedule is produced which is subsequently executed by the remote control unit. When producing the schedule, a monitoring, optimisation or other alteration to the proposed schedule may take place. However, it is just as easily possible to adopt the proposed schedule unchanged.

Subsequently, the schedule is transmitted from the central control unit to the remote control unit, a computer network again being used. The aforementioned possibilities apply to the computer network.

According to the schedule, an automatic control of the at least one remote energy generation plant takes place by means of the remote control unit. In other words, in principle, the schedule may be executed automatically without further manual intervention. At least when altering a guideline for the operation of the plant from a given time interval to the next time interval, no manual intervention is necessary in the management of the plant. However, for the operation of the remote energy generation plant according to the schedule, the collaboration of an operator may be necessary, for example in order to introduce renewable raw materials into the fermenter of a biogas plant.

By means of the method according to the invention, the ability to plan the energy generation is substantially improved. Firstly, the production of a proposed schedule forces the responsible person in each case to deal with the operation of the plant in a very specific manner for each time interval of the planned time period. As a result, a substantial basis for the ability to plan is provided. Additionally, when producing the schedule based on the proposed schedule, a monitoring of the relevant presettings, for example of their plausibility, may be carried out. This contributes to the fact that the schedule subsequently predetermined for the operation of the plant may actually be observed. A further particular advantage of the method is the automatic execution of the schedule which has been produced, whereby the actual plant operation is less affected by common, unforeseeable circumstances. For example, a power increase which is predetermined for a specific time by the schedule is reliably implemented, even when the plant operator is indisposed due to illness or even a telephone conversation. This contributes substantially to the fact that the energy generation takes place as planned. At the same time, the operation of the energy generation plant is substantially simplified. Furthermore, the method may be easily carried out by utilising computer networks for transmitting the proposed schedule and the schedule.

In one embodiment of the method, when producing the proposed schedule or the schedule, forecasts of the operating conditions of the at least one remote energy generation plant are taken into account. This measure contributes to the fact that a schedule which has been produced may be actually observed.

In a further embodiment, the presettings of the proposed schedule and/or of the schedule comprise an active power and/or reactive power to be generated and/or network system services to be produced. In principle, the presettings for the operation of the remote energy production plant may be very simple, namely merely consisting of on/off information. It is, however, also possible to provide subtly different presettings, namely specific desired values for the active power or reactive power. Moreover, it is also conceivable to use the method for improving the ability to plan network system services. These comprise, in particular, controlling the active power, reactive power, frequency and/or a voltage. During the operation of separate networks and also during the operation of public networks, the aforementioned network system services are in high demand and absolutely necessary in order to permit a stable network operation. The network system services may, in principle, also be produced by remote energy generation plants, which are operated by renewable energy sources. Therefore, the invention provides for the incorporation of corresponding presettings into the method. As a result, the ability to plan even the network system services may be optimised.

In a further embodiment of the method, the proposed schedule is produced by a person who is locally responsible for the operation of the at least one remote energy generation plant. Due to the transmission of the proposed schedule, which is provided according to the invention, to the central control unit via a computer network, the proposed schedule may, in principle, be produced at any location. Preferably, the proposed schedule takes into account similar and/or location-specific characteristics, via which those responsible for the local operation of the plant according to the invention are kept informed substantially more accurately than other groups of people considered for producing the proposed schedules, namely sales executives of an operating company or marketing company. The method makes it possible to use this local know-how in a simple manner to improve the ability to plan the operation of the plant.

An embodiment of the method provides that the proposed schedule is produced by means of a computer network. In addition to the transmission of the proposed schedule provided via a computer network, the production of the proposed schedule itself is also simplified as a result. In particular, it is conceivable to provide a Web interface, which makes it possible to produce the schedule using a conventional Internet browser. As a result, the technical provisions for producing the proposed schedule are very simple and immediately available anywhere. For example, a person responsible for the local operation of the energy generation plant may produce a proposed schedule at the weekend from home or during a business trip from a hotel.

According to one embodiment, when producing the schedule in the central control unit, a comparison of the proposed schedule takes place with a forecast demand and the schedule is produced, adapted to the demand, optionally deviating from the proposed schedule. This makes it possible in a simple manner to take into account a centrally available demand forecast during the operation of the plant. In particular, with a proposed schedule which exceeds a forecast demand, the presettings contained in the proposed schedule may be reduced for the actual schedule, without this jeopardising the planned execution of the schedule. It is also possible, in addition, to store the reduction of the presettings which has been carried out in the schedule relative to the proposed schedule. It may be assumed, therefore, that the reduction which has been carried out corresponds to an available reserve, which may be called upon if required.

In one embodiment, the remote control unit comprises a monitoring device which monitors operating data and/or environmental conditions of the at least one remote energy generation plant. The monitored operating data comprise, for example, the generated active power and/or reactive power or a quantity of gas stored in a gas store of a biogas plant. The environmental conditions include meteorological data, such as temperature or wind strength. The monitoring of the aforementioned variables permits a simple monitoring as to whether a predetermined schedule is observed.

In one embodiment, the operating data and/or environmental conditions monitored by the monitoring device are transmitted via a computer network to the central control unit and compared with the schedule. The comparison with the schedule may preferably take place in real time. In this manner, the observance of the schedule may be monitored at low cost at a central location.

According to one embodiment of the method, a plurality of remote energy generation plants are present which are operated by renewable energy sources, a corresponding number of proposed schedules and schedules being produced. On the one hand, the advantages of the method already set forth in detail are therefore achieved simultaneously in a plurality of energy generation plants, only one central control unit being necessary. On the other hand, by grouping together a plurality of remote energy generation plants, the ability to plan the energy generation is further improved, as deviations which may be present of individual schedules are less crucial.

In one embodiment, a schedule is adapted when the comparison of the operating data and/or environmental conditions monitored by the monitoring device exhibits deviations from the schedule. As a result, it is possible to counteract the established deviations from the schedule. If, for example, a remote energy production plant falls short of the presettings according to the schedule, a compensation may be carried out by altering the schedule of a further remote energy generation plant. In this case, in particular, the information present in the central control unit about the possibility of increasing the presettings of the other energy generation plant may be utilised, namely when, as set forth above, a reduction of the proposed schedule which is present for the other energy generation plant has been previously carried out. By alternatively or additionally considering the operating conditions, during the comparison it is also possible to forecast which further sequence the established deviations will adopt. If the monitored operating conditions reveal a technical fault of the plant, it may be concluded that an operation according to the schedule will no longer be possible for a specific time period. It is then possible to adapt accordingly the schedule of the plant affected by the fault, i.e. for example to set all presettings to zero. At the same time, compensation may take place by means of a further energy generation plant already in operation or an energy generation plant to be additionally put into operation, which again takes place by altering the respective schedules. As the schedule of the energy generation plant affected by the deviation is also adapted, the energy may be generated as a whole according to the schedules present in the central control unit. It is impossible that a plant affected by a fault, for example, is put into operation again without this previously being able to be taken into account by a corresponding schedule.

In a further embodiment, in the central control unit a report is produced which comprises deviations from the schedule and/or the schedules. Preferably, the report may be produced automatically by a specific reporting module. As a result, a long-term statistical evaluation of the deviations occurring is possible, for example, which provides a significant basis for optimising the production of the schedule.

According to one embodiment, the report is transmitted via a computer network to the person locally responsible for the operation of the at least one respective remote energy generation plant. As a result, when producing their proposed schedules, this person may also benefit from the information present about deviations.

In one embodiment, a primary coordination point is present which produces and/or alters a proposed pool schedule for a plurality of remote energy generation plants connected to the central control unit, and transmits said proposed pool schedule via a computer network to the central control unit. The primary coordination point may, for example, be an operator of a group of several remote energy generation plants. For producing or altering the proposed pool schedule, for example, a Web interface may be used, as disclosed above during the production of a separate proposed schedule. By incorporating the primary coordination point in the planning of the plant operation, the ability to plan and the observance of external presettings may be improved.

BRIEF DESCRIPTION OF THE DRAWING

FIG. 1 shows schematically the construction of a system according to the invention.

DETAILED DESCRIPTION OF THE INVENTION

While this invention may be embodied I many different forms, there are described in detail herein a specific preferred embodiment of the invention. This description is an exemplification of the principles of the invention and is not intended to limit the invention to the particular embodiment illustrated.

The system serves for using renewable energy sources and comprises
- at least one remote energy generation plant which is operated by a renewable energy source,
- a remote control unit at the location of the at least one remote energy generation plant, which may control the operation thereof automatically according to a predeterminable schedule, and
- a central control unit which comprises a device for receiving a proposed schedule via a computer network, a device for producing a schedule based on the proposed schedule and a device for transmitting the schedule to the remote control unit via a computer network.

The system is suitable for carrying out the method according to the invention. With regard to the explanation of the terms used and the advantages achievable by the system, reference is made to the above explanations of the method.

In one embodiment, the at least one remote energy production plant is a biogas plant. In principle, the system may be operated by any energy generation plants which are operated by renewable energy. A biogas plant offers the particular advantage that its operation may be more easily planned within certain limits than, for example, the operation of a photovoltaic plant. This is due to the fact that the biogas plant is namely very much dependent on locally available, renewable raw materials to be converted in the biogas plant, but which are frequently obtained with a certain regularity and additionally are capable of storage. The same applies to the biogas produced, which optionally may be temporarily stored in the plant. For this reason, a predetermined schedule of the biogas plant may be executed in a particularly reliable manner.

The invention is described hereinafter in more detail with reference to an embodiment shown in a figure. The only figure shows schematically the construction of a system according to the invention for using renewable energy sources and illustrates the use of the corresponding method.

The system shown in the figure has an energy generation plant 10 which is operated by renewable energy. In the example it is a biogas plant. The operator 12 is responsible for the operation of the energy generation plant 10. In this case, the operation of the energy generation plant 10 is subjected to environmental conditions 14, for example to a specific external temperature. The energy generation plant 10 may be connected to a separate network or to a public power supply grid.

The operator 12 locally responsible for the operation of the energy generation plant 10 produces, by means of an Internet browser 16 via a Web interface 18, a proposed schedule 20 which contains presettings for the operation of the energy generation plant 10. In the example shown, these presettings refer to the electrical power available from the energy generation plant 10 as well as thermal power. For both power values, the schedule has desired values which are respectively constant for a time interval of fifteen minutes. The entire proposed schedule 20 covers a time period of one day and thus contains 96 presettings for each of the two power values. The Internet browser 16 is connected via a computer network 22, in this case the Internet, to the central control unit 24. The central control unit comprises a control module 26, a monitoring module 28 and a reporting module 30.

In the central control unit 24, the proposed schedule is used as a basis for producing a schedule 32 by considering forecasts for the operating conditions of the energy generation plant 10 and by considering a forecast demand. This schedule 32 is transmitted via a computer network 34 to the remote control unit 36.

The transmitted schedule 32 is initially stored in the remote control unit. The remote control unit 36 contains a further schedule 38, which is denoted as "Schedule 1", and which is still executed at the time of the transmission of the schedule 32. This relates to the current day, whilst the schedule 32 applies to the following day. The remote control unit 36 has a control module 40 which, based on the information of the current "Schedule 1" 38, transmits control commands directly to the management of the energy generation plant 10. In this manner it is ensured that the energy generation plant 10 is operated according to the current schedule.

Also shown in the figure is the monitoring which has been provided of the status of the energy generation plant 10. To this end, the remote control unit 36 has a monitoring device 42 which by means of sensors, not shown, on the one hand detects the environmental conditions 14. Additionally, the monitoring device 42 detects operating data of the energy generation plant 10. Amongst these are included, in particular, the currently available active power, the currently available reactive power or other factors important for the operation of the energy generation plant, namely the quantity of an available fuel or the temperature in a fermenter. Relative to this is shown in the figure that the monitoring device 42 provides the monitored variables separately according to the variables 44 and other operating conditions 46 relevant to the production of the energy generation plant, and via separate computer networks 48 and 50 forwards said variables to the central control unit 24, more specifically to the monitoring module 28 located therein. Naturally, the aforementioned data may also be transmitted together via a single computer network.

The data of the status monitoring received in the central control unit 24 from the monitoring module 28 are made available to the control unit 26 of the central control unit 24. This may immediately cause, therefore, an alteration to the schedule. At the same time, the data from the monitoring module 28 are forwarded to the reporting module 30, which is also connected to the control unit 26, in order to obtain information about the schedules. Based thereon, the reporting module 30 produces a report which compares the presettings of a schedule and the data provided by the monitoring device 42 with one another and produces a report about the deviations established. This report is made available via a computer network 52 to the operator 12 of the energy generation plant 10.

As a further possibility for producing proposed schedules, and the influence on the schedules, a further input device is shown in the figure which, in turn, substantially consists of an Internet browser 54. It comprises a Web interface 56 and a proposed pool schedule 58 which groups together a plurality of individual proposed schedules and relates to a group of energy generation plants which are operated by a primary coordination point 60. This primary coordination point 60 has the possibility of producing or altering proposed pool schedules 58 itself. The proposed pool schedules 58 are, in turn, transmitted via a computer network 62 to the central control unit 24. The report produced by the reporting module 30 is also forwarded via a further computer network 64 to the primary coordination point 60.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for using renewable energy sources, the method comprising the following steps:
    a) Producing a proposed schedule (20), in which for a future time period subdivided into shorter time intervals, presettings for an operation of at least one remote energy generation plant (10) in each of the shorter time intervals are established, and transmitting the proposed schedule (20) to a central control unit (24) via a computer network (22),
    b) Producing a schedule (32) based on the proposed schedule (20), wherein the schedule (32) includes presettings for the operation of the at least one remote energy generation plant (10) which is operated by a renewable energy source, in each of the shorter time intervals of the future time period,
    c) Transmitting the schedule (32) from the central control unit (24) to a remote control unit (36) at the location of the at least one remote energy generation plant (10), which controls the operation thereof, via a computer network (34),
    d) Automatic control of the at least one remote energy generation plant (10) by the remote control unit (36) according to the schedule (32);
    wherein when producing the schedule (32) in the central control unit, a comparison of the proposed schedule (20) takes place with a forecast demand and the schedule (32) is produced, adapted to the demand, and optionally deviates from the proposed schedule (20).

* * * * *